UNITED STATES PATENT OFFICE.

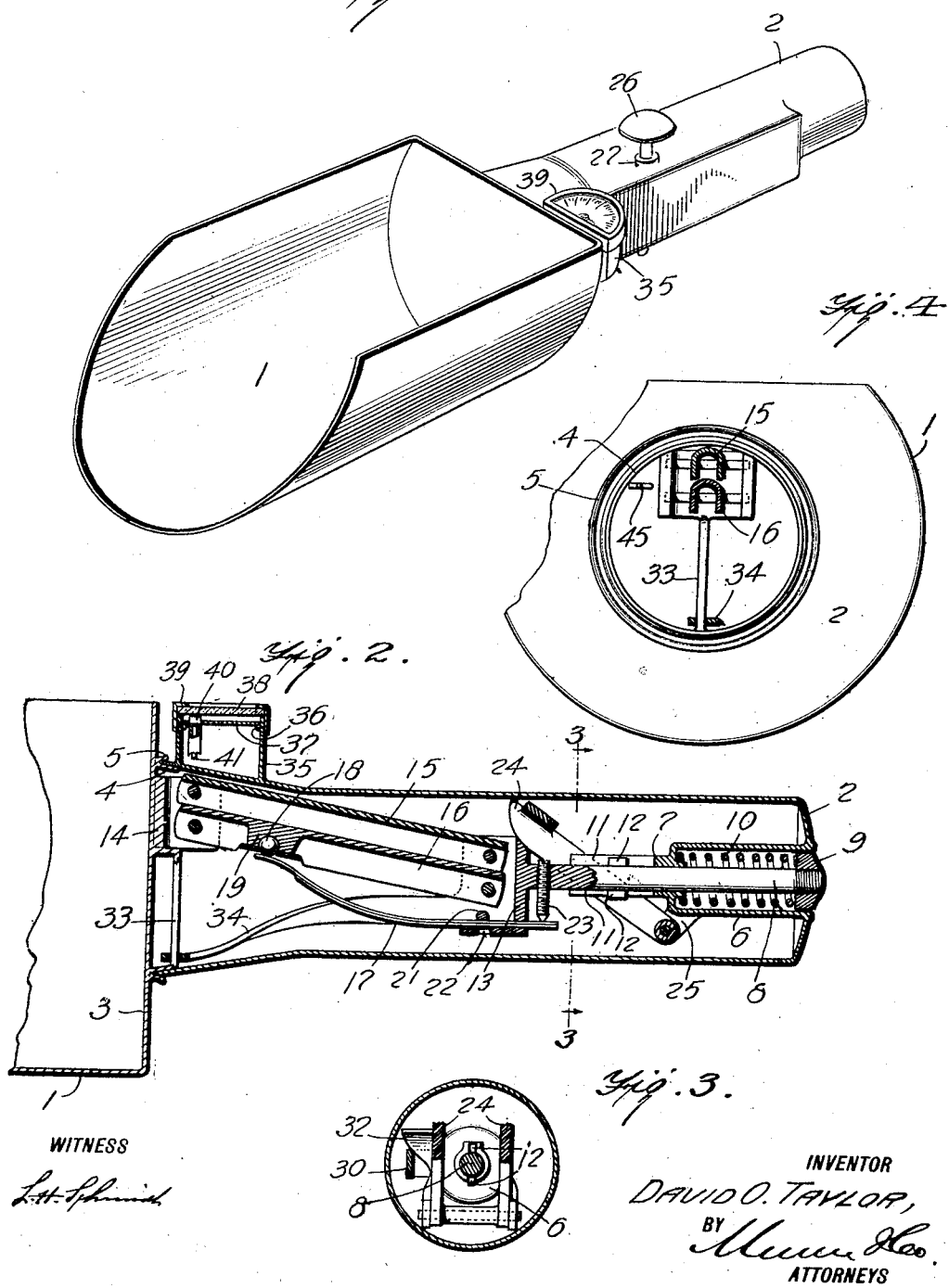

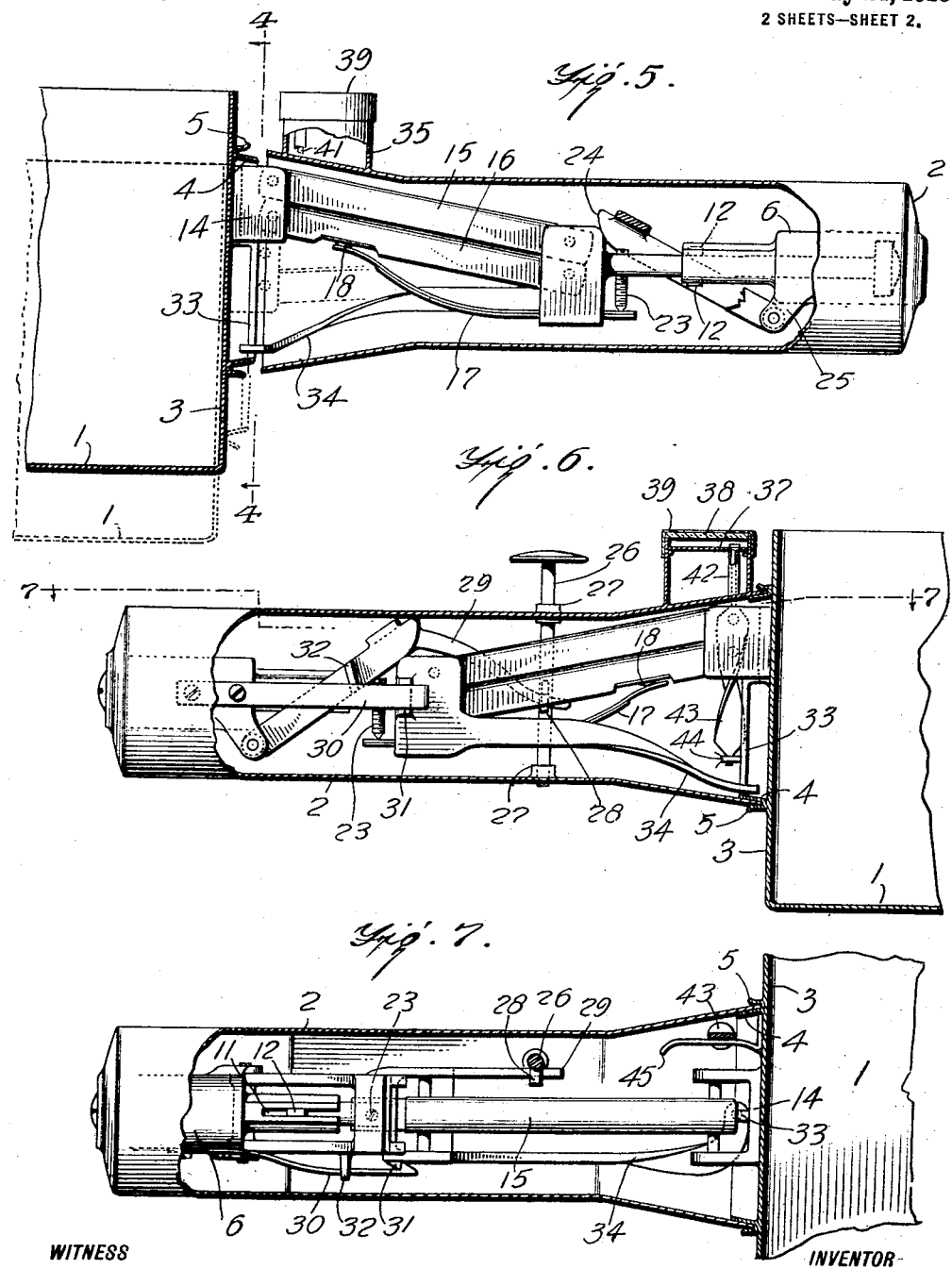

DAVID O. TAYLOR, OF WEST POINT, MISSISSIPPI.

SCOOP.

1,266,881.

Specification of Letters Patent. Patented May 21, 1918.

Application filed June 1, 1917. Serial No. 172,187.

*To all whom it may concern:*

Be it known that I, DAVID O. TAYLOR, a citizen of the United States, and a resident of West Point, in the county of Clay and State of Mississippi, have invented a new and useful Improvement in Scoops, of which the following is a specification.

My invention is an improvement in scoops of the character designed for grocers' use, wherein a scoop and a handle are provided, and weighing mechanism in connection with the handle and operated by the downward movement of the scoop under the influence of the weight in the scoop, and wherein means is provided for locking the handle to the scoop in a manner to prevent the entrance of pulverulent matter, during the insertion of the scoop into such matter.

In the drawings:—

Figure 1 is a perspective view of the improved scoop,

Fig. 2 is a longitudinal section,

Fig. 3 is a section on the line 3—3 of Fig. 2, looking in the direction of the arrows adjacent the line, Fig. 4 is a section on the line 4—4 of Fig. 5, looking in the direction of the arrows adjacent the line Fig. 5 is a view similar to Fig. 2 with the parts in another position, Fig. 6 is a section looking at the opposite side from Fig. 5, and showing the parts in the position of Fig. 2, Fig. 7 is a section on the line 7—7 of Fig. 6, looking in the direction of the arrows adjacent the line.

In the present embodiment of the invention a scoop 1 is provided connected to a hollow or tubular handle 2, and the scoop at its closed end 3 is provided with spaced flanges 4 and 5, between which the open end of the handle 2 engages to form a tight joint of the handle with the handle and the scoop, to prevent the entrance of pulverulent or granular matter, such for instance, as flour, sugar and the like.

The handle 2 is provided with an inwardly extending axial tubular extension 6 at its closed end and the extension has a bearing sleeve 7 at its inner end in which is mounted to slide a stem 8. This stem has a nut 9 on its outer end, within the extension 6, and a coil spring 10 is arranged in the extension between the nut and the inner end of the extension, the spring acting normally to force the stem away from the scoop. The guide 7 is slotted above and below the stem as indicated at 11 and the stem has keys 12 engaging the slots to prevent rotary movement of the stem. The stem has a head 13 at its inner end, the head being substantially U-shaped, and the closed end 3 of the scoop is provided with a similar head 14 also of substantial U-shape. U-shaped bars 15 and 16 are pivoted to the heads at their ends and connect the scoop to the stem 8. These bars are arranged one above the other, and it will be evident that when the open end of the handle 2 is freed from the flanges 4 and 5 in a manner to be presently described, the scoop may swing downward on the bars 15 and 16.

The scoop is normally pressed upward by a plate spring 17 which bears at one end against a ball 18 held in a solid portion 19 of the bar 16, and at the other end the spring is held between a web 20 at the under side of the head 13, and a pin 21 extending transversely of the head. It will be noticed that the web is slotted below the pin, as indicated at 22, and the outer end of the spring extends beyond the head and is engaged by a set screw 23 by means of which the tension of the spring may be regulated. This set screw is threaded through the stem 8. The spring 10 acts to hold the open end of the handle in engagement with the flanges 4 and 5 and means is provided for pressing the stem toward the scoop, to release the handle from the flanges in order that the weighing function of the scoop may take place. The said means is a yoke-shaped cam lever 24 comprising a body extending transversely of the head and arms pivoted to downwardly extending lugs 25 at the inner end of the extension and the ends of the arms adjacent to the head are beveled as shown, to engage the head, to force the said head toward the scoop when the lever is pressed downwardly.

This lever is controlled by a headed pin 26 movable transversely of the handle in guides 27 in the handle, and the pin has a perforated laterally extending lug 28 intermediate its ends, which is engaged by an arm 29 extending from one of the arms of the yoke-shaped cam lever. It will be evident that when the headed pin is pressed downward the yoke-shaped lever will be moved downwardly to cause the beveled ends of the arms of the lever to engage the head, to press the head and the stem toward the scoop. As soon as the headed pin is released the spring 10 will return the parts to the normal position shown in Figs. 6 and 7.

Latch mechanism is provided for locking the parts in the position shown in the said figures. This mechanism comprises a resilient latch 30 having one end secured to the extension and the other end of the latch is provided with a tooth for engaging a catch 31 on the head. One of the arms of the cam lever 24 is provided with a bevel lug 32 engaging the latch for moving the latch outward to disengage the catch 31 when the cam lever is depressed by the headed pin. As soon as the pin is released and the spring returns the parts to normal position, the catch 31 will engage the tooth of the latch, the said catch and tooth being beveled to permit the catch to move the latch outwardly. The scoop is held rigid at its lower side when not in weighing position by a depending pin 33 which engages an opening in a guide arm 34 extending outwardly from the head.

By removing the nut at the handle the entire mechanism may be removed from the handle for oiling or cleaning.

A nipple 35 extends upwardly from the handle adjacent to the scoop, the said nipple being substantially semi-circular in cross section, and the nipple has an annular rib 36 near its top. Upon this rib is arranged a scale 37 and a plate 38 of glass is held on the top of the nipple by a bezel ring 39. An indicator 40 coöperates with the scale, the indicator being connected to a shaft 41 journaled on a bearing sleeve 42 held by the scale and by the nipple, and the shaft is secured to the upper end of a bar 43 which is of spiral form. The lower end of the bar is journaled in a bearing lug 44 in the handle, and the spiral bar is engaged by an operating arm 45 extending outwardly from the closed end of the scoop.

It will be evident that when the scoop is released from the handle, as before described, with a weight in the scoop, the downward movement of the scoop under the influence of the weight will cause the arm 45 to rotate the spiral bar and to swing the indicator to indicate the correct weight of the material held within the scoop.

In operation when it is desired to weigh a certain amount of sugar, for instance, the scoop with the parts in the position of Fig. 2 is inserted in the sugar and the approximate amount is taken up in the scoop. The headed pin is now depressed, to release the handle from the flanges 4 and 5, and the weight of the sugar in the scoop will swing the scoop downward with respect to the handle as indicated in Fig. 5, and the weight of the sugar in the scoop will be registered by the indicator on the scale. In this manner the material being dispensed may be measured as it is removed from the container. The engagement between the handle and the flanges 4 and 5 positively prevents the entrance of pulverulent or granular matter, which might interfere with the proper operation of the weighing apparatus.

I claim:—

1. A scoop of the character specified comprising a scoop and a handle, the handle being tubular and having one end open, and the scoop having inner and outer flanges between which the handle may engage to seal the open end of the handle, a stem having guided movement axially of the handle toward and from the scoop, a spring normally pressing the stem in a direction away from the scoop, bars pivotally connecting the stem and the scoop for permitting the scoop to swing downwardly with respect to the stem, means in connection with the stem for guiding the scoop and holding it horizontal, a spring normally pressing the scoop upward, means for moving the stem toward the scoop to release the flanges from the handle, and indicating mechanism controlled by the downward movement of the scoop for indicating the weight in the scoop, latch mechanism for holding the flanges in engagement with the handle and released by the means for moving the stem toward the scoop.

2. A scoop of the character specified comprising a scoop and a handle, the handle being tubular and having one end open, and the scoop having inner and outer flanges between which the handle may engage to seal the open end of the handle, a stem having guided movement axially of the handle toward and from the scoop, a spring normally pressing the stem in a direction away from the scoop, bars pivotally connecting the stem and the scoop for permitting the scoop to swing downwardly with respect to the stem, means in connection with the stem for guiding the scoop and holding it horizontal, a spring normally pressing the scoop upward, means for moving the stem toward the scoop to release the flanges from the handle, and indicating mechanism controlled by the downward movement of the scoop for indicating the weight in the scoop.

3. A scoop of the character specified comprising a scoop and a handle, the handle being tubular and having one end open, and the scoop having inner and outer flanges between which the handle may engage to seal the open end of the handle, weighing mechanism controlled by the downward movement of the scoop with respect to the handle, spring mechanism normally holding the handle in engagement with the flanges, means for pressing the scoop away from the handle to permit it to move downward with respect to the handle, and spring latch mechanism for holding the handle and the scoop in engagement and released by the means for pressing the scoop away from the handle.

4. A scoop of the character specified comprising a scoop and a handle, the handle being tubular and having one end open, and the scoop having inner and outer flanges between which the handle may engage to seal the open end of the handle, weighing mechanism controlled by the downward movement of the scoop with respect to the handle, spring mechanism normally holding the handle in engagement with the flanges, means for pressing the scoop away from the handle to permit it to move downward with respect to the handle.

5. A scoop of the character specified comprising a scoop and a handle, the scoop having flanges for engagement by the handle to seal the space between the scoop and the handle, spring mechanism for holding the scoop tightly to the handle, weighing mechanism controlled by the relative movement of the scoop and handle, and means for releasing the scoop from the handle.

6. A scoop of the character specified comprising a scoop and a handle, the scoop having a flange for engagement by the handle to seal the space between the scoop and the handle, spring mechanism for holding the scoop tightly to the handle, weighing mechanism controlled by the relative movement of the scoop and handle, and means for releasing the scoop from the handle.

DAVID O. TAYLOR.

Witnesses:
H. D. JOHNSON,
MARTIN ROSE.

Copies of this patent may be obtained for five cents each, by addressing the "Commissioner of Patents, Washington, D. C."